(12) United States Patent
Baykal

(10) Patent No.: US 9,294,534 B2
(45) Date of Patent: Mar. 22, 2016

(54) APPLYING HEURISTICS TO MANAGE MULTICAST SUBSCRIPTIONS WITHIN COMPUTER NETWORKS

(75) Inventor: Berkay Baykal, Newton, MA (US)

(73) Assignee: Calix, Inc., Petaluma, CA (US)

( * ) Notice: Subject to any disclaimer, the term of this patent is extended or adjusted under 35 U.S.C. 154(b) by 680 days.

(21) Appl. No.: 13/552,258

(22) Filed: Jul. 18, 2012

(65) Prior Publication Data

US 2014/0026174 A1    Jan. 23, 2014

(51) Int. Cl.
*H04N 7/173* (2011.01)
*H04L 29/06* (2006.01)
*H04N 21/438* (2011.01)
*H04N 21/6371* (2011.01)
*H04N 21/643* (2011.01)

(52) U.S. Cl.
CPC ............ *H04L 65/80* (2013.01); *H04L 65/4076* (2013.01); *H04N 21/4384* (2013.01); *H04N 21/6371* (2013.01); *H04N 21/64322* (2013.01)

(58) Field of Classification Search
None
See application file for complete search history.

(56) References Cited

U.S. PATENT DOCUMENTS

| | | | |
|---|---|---|---|
| 7,269,182 B1 | 9/2007 | Carrel et al. | |
| 7,289,501 B2 | 10/2007 | Davis | |
| 2002/0191628 A1 | 12/2002 | Liu et al. | |
| 2004/0033075 A1 | 2/2004 | Koch et al. | |
| 2005/0232272 A1 | 10/2005 | Deng | |
| 2006/0146857 A1 | 7/2006 | Naik et al. | |
| 2007/0223475 A1* | 9/2007 | De Vleeschauwer et al. | 370/390 |
| 2007/0280236 A1 | 12/2007 | Yang | |
| 2008/0056293 A1 | 3/2008 | Robbins et al. | |
| 2008/0310518 A1* | 12/2008 | Song et al. | 375/240.27 |
| 2009/0080328 A1 | 3/2009 | Hu et al. | |
| 2009/0290585 A1 | 11/2009 | Deng | |
| 2010/0017815 A1* | 1/2010 | Mas Ivars et al. | 725/14 |
| 2010/0202452 A1 | 8/2010 | Ram et al. | |
| 2013/0046849 A1* | 2/2013 | Wolf et al. | 709/217 |

FOREIGN PATENT DOCUMENTS

EP    0902569 A1    3/1999

OTHER PUBLICATIONS

RFC 3376, Internet Group Management Protocol, Version 3, Oct. 2002, 53 pages.
White Paper, "Introduction to IGMP for IPTV Networks—Understanding IGMP Processing in the Broadband Access Network," Juniper Networks, Inc
RFC 2236, Internet Group Management Protocol, Version 2, Nov. 1997, 18 pages.
RFC 1112, Host Extensions for IP Multicasting, Aug. 1989, 17 pages.

* cited by examiner ., Oct. 2007, 12 pages.

*Primary Examiner* — Omar S Parra
(74) *Attorney, Agent, or Firm* — Shumaker & Sieffert, P.A.

(57) ABSTRACT

An access node comprises a control unit that determines an anticipated working set of television channels based on a historically delivered working set of television channels to which a subscriber network has previously subscribed. The anticipated working set indicates a time at which the subscriber network is expected to subscribe to a different set of channels. The access node includes at least one interface that couples the access node to the subscriber network, that prior to the time at which the subscriber network is expected to subscribe to the different set of channels, subscribes to the different set of television channels in accordance with the anticipated working set such that media content associated with the different channels of the anticipated working set is available for delivery to the subscriber network at the time during which the access node expects the subscriber network to subscribe to the different set of channels.

22 Claims, 4 Drawing Sheets

APPLYING HEURISTICS TO MANAGE MULTICAST SUBSCRIPTIONS WITHIN COMPUTER NETWORKS

TECHNICAL FIELD

The disclosure relates to computer networks and, more particularly, communicating data within computer networks.

BACKGROUND

A service provider network typically comprises a number of different types of computer networks interconnected to one another. One type of network referred to as an access network enables subscriber devices, which may also be referred to as customer premises equipment (CPE), to access the service provider network. Subscriber devices or CPE may comprise set-top boxes (STBs), laptop computers, desktop computers, mobile devices (such as mobile cellular phones and so-called "smart phones"), Voice over Internet Protocol (VoIP) telephones, workstations, modems, wireless access points (WAPs), and other devices capable of accessing or otherwise facilitating access to the service provider network.

The access network typically comprises a number of access nodes, such as a Digital Line Subscriber Line Access Multiplexers (DSLAMs) or a Cable Modem Termination System (CMTS), that each manages access by one or more of the subscriber devices to the service provider network. The access node may, for example, multiplex traffic from subscriber devices into a composite signal and transmit this signal upstream to the subscriber network for delivery to one or more destinations. The access nodes may also manage multicast communications or streams to more efficiently utilize bandwidth of the access network between the access nodes and the subscriber devices.

For example, an access node may implement a multicast management protocol, such as an Internet Group Management Protocol (IGMP). IGMP provides a way to track subscriber device memberships in multicast groups. The subscriber devices may issue an IGMP join request to indicate to the access node that it has joined a multicast group. The access node may maintain a multicast group membership table that includes an entry for each multicast group currently subscribed to by at least one subscriber device. In response to the IGMP join request, the access node may update an entry in this table associated with the indicated multicast group to reflect the new membership by the subscriber device.

Likewise, the subscriber device may issue an IGMP leave request, indicating that the subscriber device has left a multicast group. The access node, in response to this leave request, may update the group membership table to reflect that the subscriber devices left the indicated group. Based on this table, the access node may determine whether one or more groups stored in the table is currently being subscribed to by more than one subscriber device. If no subscriber devices are subscribing to a particular multicast group, the access node may stop streaming or otherwise delivering the multicast content from this group to the subscriber devices, thereby more efficiently utilizing the bandwidth in the access network.

ISPs may use IGMP as a mechanism for providing Internet Protocol Television (IPTV) services to subscribers. Consumer premises equipment (CPE), such as set-top-boxes (STBs) may request a particular channel from an access node. Both the STB and the access node may be configured to use IGMP to provide the IPTV services. The STB may construct and send an IGMP join request to the access node. The IGMP join request contains a request to subscribe to a particular multicast group. The multicast group may be associated with a particular IPTV channel, for example, that a subscriber wishes to watch.

If the access node is already subscribed to the requested channel multicast group, the access node adds the CPE to a multicast group table associated with the channel. The access node then fulfills the request for the channel by transmitting multicast content associated with the multicast group to the CPE. If the access node is not already subscribed to the requested channel, the access node propagates the request for the channel to a multicast router, which in turn, propagates the request to a multicast server. The multicast server adds the access node to a multicast group table of the multicast server associated with the channel. The multicast server fulfills the channel request by transmitting the multicast content associated with the multicast group to the access node. The access node then adds the CPE to the multicast group table of the access node, and transmits the multicast channel content to the CPE.

SUMMARY

In general, techniques are described in this disclosure for using historical heuristics or usage patterns to determine television (TV) channels to which an access node that delivers an Internet Protocol television (IPTV) service via a network should subscribe. More particularly, an access node coupled to a subscriber network may implement the techniques to determine which TV channels to deliver via the IPTV service to subscribers based on previously delivered channels to the subscribers within a given subscriber network. Considering the large amount of bandwidth each TV channel of an IPTV service consumes, the techniques may enable the access node to adaptively subscribe to IPTV channels based on historical subscriber subscription to IPTV channels such that the access node may not needlessly consume network bandwidth by subscribing to IPTV channels that users are not likely, based on this historical subscription to IPTV channels, to watch. Moreover, the techniques may further enable the access node to subscribe to those IPTV channels that are more likely to be requested as determined by this historical data defining previous subscription to IPTV channels prior to these IPTV channels actually being requested by the subscribers. In this way, the techniques may not only promote more efficient bandwidth usage but may also provide IPTV channels that are more likely to be requested to subscribers with reduced delay considering that the access node subscribes to these IPTV channels prior to the subscribers requesting these IPTV channels.

In an example, a method is performed by an access node coupled to at least one subscriber network, the method comprising adaptively determining an anticipated working set of a plurality of television channels based on a historically delivered working set of television channels comprising those of the plurality of television channels to which the at least one subscriber network has previously subscribed, wherein the anticipated working set specifying a different set of the plurality of television channels to which the at least one subscriber network is expected to subscribe at a specific time, and prior to the specific time at which the subscriber network is expected to subscribe to the different set of the plurality of television channels, subscribing to the different set of television channels in accordance with the anticipated working set such that media content associated with the different set of the plurality of television channels of the anticipated working set is available for delivery to the at least one subscriber network at the specific time during which the access node expects the at least one subscriber network to subscribe to the different set of the plurality of television channels.

In another example, an access node is coupled to at least one subscriber network, wherein the access node comprises a control unit that adaptively determines an anticipated working set of a plurality of television channels based on a historically delivered working set of television channels comprising those of the plurality of television channels to which at least one subscriber network has previously subscribed, wherein the anticipated working set specifying a different set of the plurality of television channels to which the at least one subscriber network is expected to subscribe at a specific time, and at least one interface that couples the access node to the subscriber network, that prior to the specific time at which the subscriber network is expected to subscribe to the different set of the plurality of television channels, subscribes to the different set of television channels in accordance with the anticipated working set such that media content associated with the different set of the plurality of television channels of the anticipated working set is available for delivery to the at least one subscriber network at the specific time during which the access node expects the at least one subscriber network to subscribe to the different set of the plurality of television channels.

In another embodiment, a system comprises a subscriber network that includes a subscriber device, a network device and an access node intermediately positioned between the subscriber network and the switch. The access node includes a control unit that a control unit that adaptively determines an anticipated working set of a plurality of television channels based on a historically delivered working set of television channels comprising those of the plurality of television channels to which the at least one subscriber network has previously subscribed, wherein the anticipated working set specifying a different set of the plurality of television channels to which the at least one subscriber network is expected to subscribe at a specific time and, and at least one interface that couples the access node to the at least one subscriber network, prior to the specific time at which the subscriber network is expected to subscribe to the different set of the plurality of television channels, subscribes to the different set of television channels in accordance with the anticipated working set such that media content associated with the different set of the plurality of television channels of the anticipated working set is available for delivery to the at least one subscriber network at the specific time during which the access node expects the at least one subscriber network to subscribe to the different set of the plurality of television channels.

In another embodiment, a non-transitory computer-readable comprises instructions encoded on the computer-readable medium that, upon execution, cause a processor within a network device to adaptively determine an anticipated working set of a plurality of television channels based on a historically delivered working set of television channels comprising those of the plurality of television channels to which the at least one subscriber network has previously subscribed, wherein the anticipated working set specifying a different set of the plurality of television channels to which the at least one subscriber network is expected to subscribe at a specific time, and prior to the specific time at which the subscriber network is expected to subscribe to the different set of the plurality of television channels, subscribe to the different set of television channels in accordance with the anticipated working set such that media content associated with the different set of the plurality of television channels of the anticipated working set is available for delivery to the at least one subscriber network at the specific time during which the access node expects the at least one subscriber network to subscribe to the different set of the plurality of television channels.

The details of one or more examples of the techniques described in this disclosure are set forth in the accompanying drawings and the description below. Other features, objects, and advantages of the techniques described in this disclosure will be apparent from the description and drawings, and from the claims.

DETAILED DESCRIPTION

Figure 1:
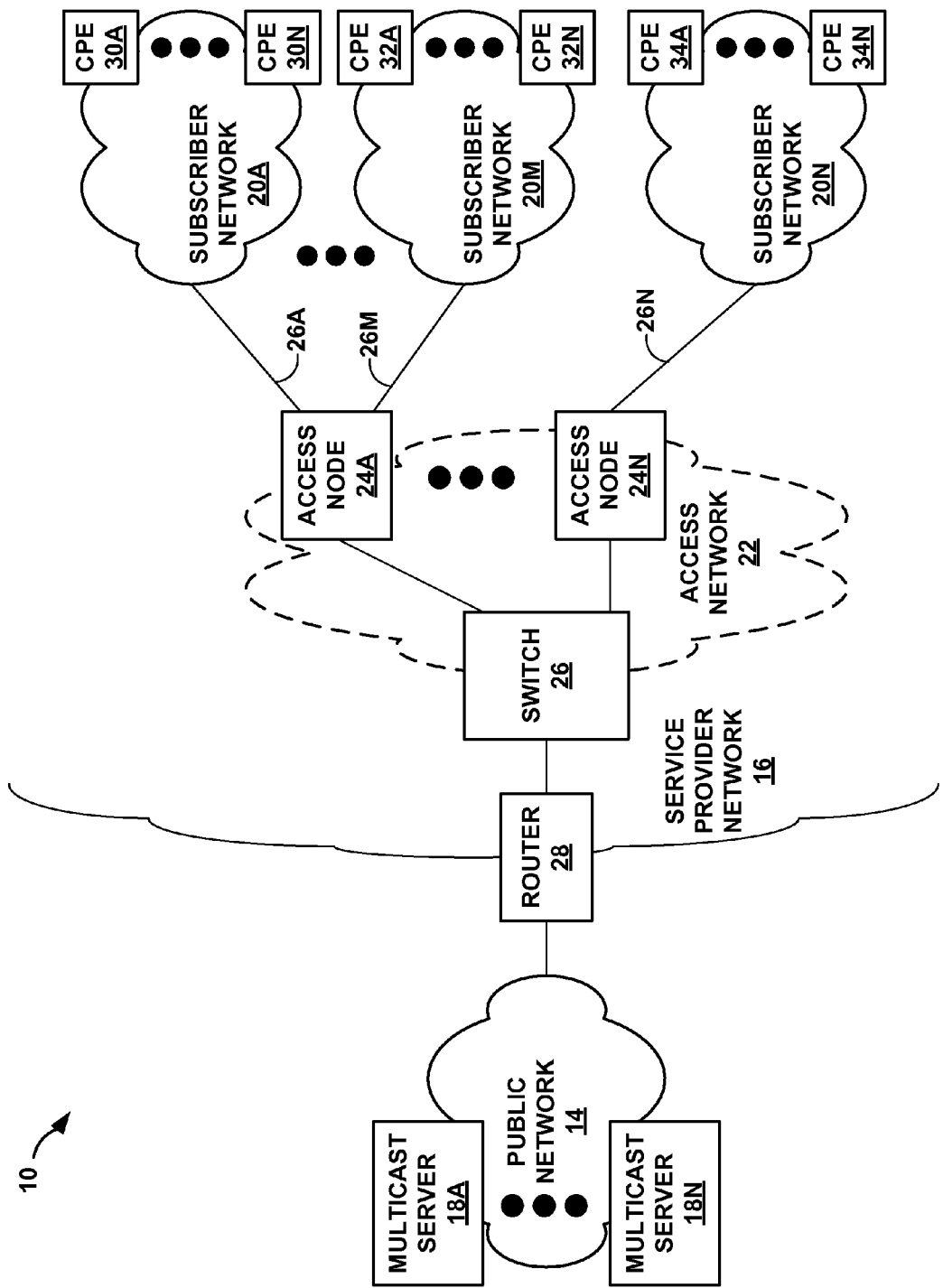
FIG. 1 is a block diagram illustrating an example network system in which one or more access nodes implement the techniques described in this disclosure.

FIG. 1 is a block diagram illustrating an example network system 10 in which one or more of access nodes 24A-24N ("access nodes 24") implements the techniques described in this disclosure. While described with respect to a particular network system 10 and particular examples of network devices, e.g., access nodes 24, the techniques may be implemented by any network device in any network system, where the network device manages delivery of multicast content or streams to other network devices. The techniques therefore should not be limited in any aspect to the various examples described in this disclosure.

In the example of FIG. 1, network system 10 includes a public network 14 and service provider network 16. Public network 14 typically comprises a packet-switched network that implements an Internet Protocol (IP). For this reason, public network 14 may be referred to as an IP packet-switched network. Also, considering that IP is a layer three (L3) protocol, where L3 refers to the third or network layer of the Open Systems Interconnection (OSI) model, public network 14 may be referred to as a L3 packet-switched network. An example public network 14 may comprise what is commonly referred to as the Internet or any other network that is generally accessible by the public.

In any event, public network 14 may comprise a plurality of interconnected network devices (not shown in FIG. 1) that communicate data in the form of IP packets between one another. These network devices may comprise web servers, application servers, data servers, print servers, routers, gateways, switches, hubs, workstations, desktop computers, laptop computers, mobile cellular phones (including so-called "smart phones"), personal digital assistants (PDAs), or any other device capable of accessing or facilitating access to public network 14, as well as multicast servers 18A-18N ("multicast servers 18"). Multicast servers 18, as described in more detail below may comprise servers that store multicast content and host multicast groups for delivery of this multicast content as multicast streams, such as IPTV streams, to members of the multicast groups.

Service provider network 16 may comprise a network maintained and operated by a service provider. Typically, the service provider may operate service provider network 16 to facilitate access by subscriber networks, such as subscriber networks 20A-20N ("subscriber networks 20"), to public network 14. A subscriber who maintains and operates one of subscriber networks 20 may contract with the service provider for this so-called "network access." To facilitate this access, service provider network 16 may include a sub-network shown in FIG. 1 as access network 22.

Access network 22 may comprise a sub-network within service provider network 16 that facilitates access to service provider network 16 by subscriber networks 20. Access network 22 may include a plurality of access nodes 24 that couple via dedicated subscriber lines 26A-26N ("subscriber lines 26") to each of subscriber networks 20, respectively. Subscriber lines 26 are "dedicated" in that each of subscriber lines 26 connects to one and only one of subscriber networks 20 to a respective one of access nodes 24 rather than connecting multiple ones of subscriber networks 20 to a respective one of access nodes 24.

When more than one of subscriber networks 20 is connected by a single one of subscriber lines 26 to a respective one of access nodes 24, the subscriber line is referred to as a "shared" subscriber line. However, even when shared, the subscriber line may be logically divided into dedicated virtual subscriber lines for each one of the subscriber networks sharing the line by way of, for example, a Virtual Local Area Network (VLAN) technique. For ease of illustration the techniques are described with respect to dedicated subscriber lines. Yet, the techniques may also be implemented with respect to shared subscriber lines and, as a result, the techniques should not be limited to the example described in this disclosure.

Access network 22 may, in one example, comprise a layer two (L2) network, where L2, much like L3 above, refers to the second or data link layer of the OSI model. An example L2 network may comprise an Ethernet network. Typically, network devices of L2 networks switch, rather than route as in L3 networks, data units (referred to as "frames" or sometimes "packets" in Ethernet networks) to one another. For this reason, access network 22 is shown with a dashed line to indicate that it may be distinct from service provider network 16 in that access network 22 may comprise a L2 network while service provider network 16 may generally comprise a L3 network.

Assuming for purposes of illustration that access network 22 represents a L2 network, access network 22 may include a switch 26 that switches data units to various ones of access nodes 24. Switch 26 may comprise a L2 network device that learns addresses associated with access nodes 24 and associates those addresses with particular ports on which switch 26 switches the data units to access nodes 24. Access nodes 24, in this example embodiment, may each comprise a Digital Subscriber Line Access Multiplexer (DSLAM) that multiplexes multiple signals received via respective subscriber networks 20 onto the single communication medium connecting access nodes 24 to switch 26.

While described herein with respect to a L2 network and L2 network devices for ease of illustration purposes, access network 22 may comprise a L3 or any other type of network, access nodes 24 may each comprise a L3 or any other type of network device and switch 26 may comprise a L3 or another other type of network device. For example, access network 22 may, in other examples, comprise a L3 packet-switched network, such as an IP network. Access nodes 24 may, in this example, comprise a Cable Modem Termination System (CMTS) or any other device that implements L3 network protocols. With respect to this example, switch 26 may route rather than switch network traffic and may represent a L3 network device referred to as a "router." Regardless, the techniques should again not be limited in this or other aspects to the examples described in this disclosure.

As further shown in FIG. 1, service provider network 16 further includes a router 28. Router 28 may represent a L3 network device that routes, rather than switches, data units from access network 22 to public network 14 and from public network 14 to access network 22. Router 28 may actively select between one or more routes to a destination and forward packets along the selected route, while switch 26 may generally maintain only one route to each destination and simply switch the data units to the appropriate destination. In this respect, a L3 network device, such as router 28 may differ from a L2 network device, such as switch 26.

As described above, service provider network 16 typically facilitate access of public network 14 by subscriber networks 20 and subscribers contract with service provider network 16 for this so-called "network access." In the past, subscribers also contracted for various other services offered over other networks maintained and operated by this or other service providers, such as a telephone service offered over a Plain Old Telephone Service (POTS) copper-based network and a television service offered over a coaxial cable-based network or a satellite-based network.

Recently, however, service providers have begun leveraging the flexibility to communicate any form of data, such as voice data associated with a telephone service and video data associated with a television service, over access networks, such as access network 22. For example, service providers now offer a telephone service over access network 22 referred to as Voice over IP or VoIP and a television service referred to as IP television or IPTV. Service providers now offer so-called triple-play packages, in which the service provider packages these data, voice and video services into a single service contract with a reduced price. This ability of a single service provider to offer these three services in one package has brought previously tangential competitor service providers, such as traditional cable television service providers and telephone service providers, into direct competition.

The rush by service providers to be first to market with a well-priced triple-play package has led to rapid development of previous technologies to accommodate delivery of both voice and video services over both L2 and L3 networks. In instances, delivery of these services has leveraged past technologies for new uses. For example, a multicast management protocol referred to as Internet Group Management Protocol (IGMP) was originally developed for academic use to enable multiple research and other scientific centers to communicate with one another simultaneously over a packet switched network. IGMP has since been used to facilitate delivery of IPTV channels to multiple subscriber networks.

With respect to IPTV, multicast servers 18 may store video content for a plurality of multicast groups. Each multicast group may represent an IPTV channel and the content associated with the multicast content may comprise channel data. Multicast servers 18 may report this group to access nodes 24, which then inform subscriber devices of subscriber networks 20 of this channel. Subscriber devices are shown in FIG. 1 as customer premise equipment (CPE) 30A-30N ("CPE 30"), 32A-32N ("CPE 32"), and 34A-34N ("CPE 34"). Each of CPE 30, 32, and/or 34 may comprise one or more of a Set-Top Box (STB), a desktop computer, a laptop computer, a PDA, a VoIP telephone, a regular telephone, a cellular phone, a smart phone, a wireless access point (WAP), a router, a switch, a hub or any other type of computing or network device capable of accessing or facilitating access of multicast content.

While described with respect to multicast servers 18 located in public network 14, the techniques may also apply in instances where service provider network 16 includes multicast servers similar to multicast servers 18 dedicated to delivery of multicast streams for IPTV purposes. In this example, service provider network 16 may download video content via satellites or some other high-speed download mechanism and store/stream this video content to the multicast servers.

Regardless of where multicast servers 18 are located, CPE 30, CPE 32, and CPE 34 of subscriber networks 20 may forward a message requesting to join one of the multicast groups to access node 24A in accordance with the multicast management protocol, IGMP. The join message may be referred to as a membership report message within the IGMP standards and this join message is sent by a "host" (a term used by the IGMP standards to refer to a member of a multicast group) whenever this host joins a particular one of the multicast groups.

Each of access nodes 24 may store data defining a multicast group membership table comprising table entries for each one of subscriber networks 20 connected to the respective ones of access nodes 24. Each table entry may list the multicast groups to which each respective one of subscriber networks 20 is a member. One of Access nodes 24 may update this table based on the membership report message to update the respective table entry to reflect the joining of the multicast group by the corresponding one of subscriber networks 20.

One of access nodes 24 may then receive content corresponding to this recently joined multicast group from multicast servers 18. This content may be referred to as "multicast streams" in that delivery of content may occur in real-time and therefore data may continually be delivered or streamed from the multicast servers 18 to IGMP hosts or members of the multicast group. The data units of the multicast stream may reference the multicast group by way of a multicast group identifier, which is typically referred to as multicast group IP address. One of access nodes 24, e.g. access node 24A may extract this multicast group IP address and use this address as a key to access the multicast group membership table. For each table entry listing the multicast group identified by extracted multicast group address, access node 24A may replicate the multicast stream and deliver a copy of the multicast stream to those of subscriber networks 20 that are members of the group.

CPE 30, which in the case of IPTV generally represent Set-Top Boxes (STBs) connected to televisions located within the subscriber premises, may "consume" this multicast stream, typically, by buffering the multicast stream and reformulating the multicast content, e.g., video and/or audio data, for display via the connected television. When one of CPE 30 requests a particular IPTV channel, CPE 30 transmits an IGMP join request to one of access nodes 24. If the one of access node 24A is already subscribed to the multicast group, access node 24A adds CPE 30 to the requested multicast group, and fulfills the IGMP join request immediately such that CPE 30 receives the channel without significant delay.

If access node 24A is not subscribed to the requested multicast group, i.e. IPTV channel, access node 24A may request to join the multicast group from router 28. Router 28 adds access node 24A to the requested multicast group. Router 28 also propagates the channel request to multicast servers 18. Multicast servers 18 transmit the media associated with the requested multicast group to router 28, which transmits the requested media content to access node 24A. Access node 24A delivers the media content to CPE 30, thereby fulfilling the channel request. When access node 24A is not already subscribed to the requested multicast group, the time necessary for access node 24A to join the requested multicast group may cause considerable delay in fulfilling the multicast join request of CPE 30. In some cases, the delay may be 100-150 milliseconds (ms) or more (if the multicast server does not have the requested content), which may negatively affect the user experience of subscribers. To avoid delay, an access node could subscribe to all of the channels available in a channel lineup.

However, the number of TV channels that are delivered to subscribers continues to grow. Channel lineups of 300, 500 or 800 channels are commonly deployed. Having an access node subscribe to all deployed channels when so many channels are deployed may impose a high bandwidth utilization that is highly undesirable. And, with the transition from SD to HD video content and possibly to 3D content, as well as increasing numbers of channels in the channel lineup, the bandwidth requirement for IPTV are expected to continue to increase.

In a case where one of access node 24A serves a small set of subscribers, having access node 24A subscribe to the entire channel lineup may far exceed the network capacity of access node 24A. As an example, if access node 24A comprises a 48 subscriber access node, it may commonly be deployed with 2.5 Gigabytes/second of network capacity. However, in many cases, IPTV channel lineups reach or and exceed an aggregate capacity of 1 Gigabyte/sec. Thus if all IPTV channels were delivered to access node 24A, roughly half of the bandwidth capacity of access node 24A would be used.

In many deployments, only 10% of the total available IPTV channels may be consumed by 90% of subscribers. And, at small subscriber densities (such as, 24 to 4,000 subscribers) it is unlikely that an access node would require the entire channel lineup. The channels most frequently requested by subscribers may change based on the time of the day. For example, subscribers may watch certain channels in the morning, and different programs in the evening, and at night. The channels that subscribers watch may also vary based on the day of the week. As another example, subscribers may watch one program that airs on a first channel on Monday night, and a different program that airs on a second channel on Tuesday night. The changes in the stations that subscribers watch may occur at predictable time intervals, e.g. every 15, 30, or 60 minutes. These time intervals may generally correspond to when one television program ends, and another program begins.

The techniques of this disclosure take advantage of the fact that subscribers may require only a subset of the entire channel lineup at any given time, and that the required subset may be predicted based on the subscription history of subscribers. At any given time, an access node, i.e., one of access nodes 24 in the example of FIG. 1, may be subscribed to a subset of IPTV channels of the entire available channel lineup. This subset is referred to as a "received working set," considering that the access node subscribes to and receives content associated with this subset of channels. The received working set is likely to contain the IPTV channels to which the subscribers most often subscribe.

As mentioned above, access node 24A may determine an anticipated working set of channels based on the subscription history of subscribers. Access node 24A may store one or more historical working sets, which may indicate historical information of which channels subscribers subscribed to at a particular date and time. Access node 24A may determine an anticipated working set based on one or more historical working sets of channels. Access node 24A may request and subscribe to some or all of the channels of the anticipated working set. Access node 24A may add the channels from the anticipated working set to which access node 24A subscribes to the received working set of channels. The received working set may include channels from the anticipated working set, as well as other channels to which subscribers are presently subscribed, but which are not in the anticipated working set.

The set of channels to which subscribers of access node 24A are subscribed to at a particular time may be referred to as a "delivered working set," considering that these are the channels that the access node delivers to subscribers. When access node 24A determines the anticipated working set based on one or more historical working sets, access node 24A attempts to predict the channels to which subscribers will actually subscribe or, in other words, the set of channels that will comprise the delivered working set.

In some instances, subscribers may request channels that are not in the anticipated working set, and consequently are not currently in the received working set. In another example, and as described in further detail below, access node 24A may be unable to subscribe to all the channels in the anticipated working set. Consequently, the received working set may not include all of the channels of the anticipated working set. As a result, access node 24A may not be able to immediately fulfill some requests for channels in the anticipated working set. In either case, when access node 24A receives a request for a channel that is not in the received working set, access node 24A requests the channel from router 28 and multicast servers 18. Multicast servers 18 and in turn router 28, may transmit the media content associated with the requested channel to access node 24A. Access node 24A may receive the requested channel and may add the channel to the received working set. Access node 24A may then deliver the requested channel to the requesting CPE, and may add the requested channel to the delivered working set.

Access node 24A may periodically store the delivered working set as a historical working set. Access node 24A may store the historical working sets as time progresses, thereby maintaining a historical record of the delivered working sets as a function of time. Access node 24A may then refer back to one or more of the stored historical working sets to determine a new anticipated working set of IPTV channels to which access node 24A should subscribe. As an example, access node 24A may determine a historical record corresponding to the current time of day, but at a day one week prior to the current day.

Using this historical record of one or more historical working sets, access node 24A may subscribe to the anticipated set of the IPTV channels prior to the times at which subscriber network 20A is expected to subscribe to a different subset of IPTV channels defined by the anticipated working set. Access node 24A may, in other words, subscribe to some or all of the channels of the anticipated working set such that the channels of the anticipated working set are available for delivery to subscriber network 20A prior to times when access node 24A expects subscriber network 20A to subscribe to the corresponding one of the different sets of the plurality of IPTV channels defined by the anticipated working set. Having the IPTV channels of the anticipated working set available for delivery to subscriber network 20A may avoid delay when CPE 30, for example, requests a channel, because access node 24A may be more likely to be subscribed to the requested IPTV channel prior to CPE 30 requesting the channel. Assuming that access node 24A is subscribed to the requested channel, access node 24A therefore does not have to request and subscribe to the IPTV channel from router 28 in response to the channel request by CPE 30 (which as noted above may add 100-150 ms of delay to fulfilling the request from CPE 30).

Access node 24A may be configured to determine a new anticipated working set of IPTV channels that correspond to a received working set at a predetermined interval of time. For example, access node 24A may determine a new anticipated set every 15, 30, 60 minutes, or a multiple thereof. Access node 24A may also be configured to receive a pre-request interval that indicates how many units of time before at least one subscriber network, e.g. subscriber network 20A, is expected to subscribe to the set of channels defined by the anticipated working set. Once the pre-request interval units of time between the current time and the time subscriber network 20A is expected to request the subset of channels defined by the anticipated working set have elapsed, access node 24A requests the subset of channels in accordance with the anticipated working set such that the media content associated with the subset of channels of the received working set is available for delivery to subscriber network 20A when subscriber network 20A is expected to request the IPTV channels defined by the anticipated working set.

When subscribing to one or more channels of the anticipated working set, access node 24A may compare the channels of the anticipated working set with the channels of the received working set. Access node 24A may compare the channels of the anticipated working set and the received working set to determine which channels are in the anticipated working set, but are not in the received working set. Based on the comparison, access node 24A may subscribe to some or all of the channels of the anticipated working which are not in the received working set. After access node 24A requests the channels from the anticipated working set, access node 24A adds the channels from the anticipated working to which access node 24A subscribed to the received working set. Requesting only anticipated channels to which access node 24A is not currently subscribed may prevent unnecessary subscription requests for channels to which access node 24A is already subscribed.

Access node 24A may maintain a count of anticipated channels to which access node 24A is currently subscribed, which may be referred to as a current anticipated channel count. In some examples, access node 24A may be configured not subscribe to more than a pre-defined maximum number of anticipated IPTV channels, i.e. channels which access node 24A determines that subscriber network 20A may request in the future. Access node 24A may determine the anticipated channels in accordance with the anticipated working set. The maximum number of anticipated IPTV channels that access node 24A may subscribe to may be indicated by a maximum anticipated channel count. Access node 24A may limit the number of anticipated channels to which access node 24A may subscribe to ensure that access node 24A does not consume large amounts of bandwidth. Each IPTV channel to which access node 24A subscribes consumes additional bandwidth, which access node 24A may need to utilize for services other than the IPTV server, such as general data or so-called "Internet" service, VoIP service, etc. Accordingly, limiting the maximum number of anticipated channels to which access node 24A may subscribe may limit the maximum bandwidth that access node 24A may consume, at least for IPTV services.

Access node 24A may be configured to receive the maximum anticipated channel count, for example, via a programming or configuration interface. Responsive to subscribing to additional channels that subscriber network 20A is expected to request in accordance with the anticipated working set, and adding the requested channels from the anticipated working set to the received working set, access node 24A increments the current anticipated channel count for each additional anticipated IPTV channel to which access node 24A subscribes. Access node 24A may continue to subscribe to additional IPTV channels and increment the current anticipated channel count until either the maximum anticipated channel count is reached, or until access node 24A has subscribed to all of the IPTV channels in the anticipated working set.

Before subscribing to one or more additional channels, access node 24A may determine whether the current access node 24A anticipated channel count is greater than or equal to the maximum anticipated channel count. If access node 24A determines that the current anticipated channel count is greater than or equal to the maximum anticipated channel count, access node 24A may not subscribe to any additional IPTV channels until the anticipated channel count is less than the maximum anticipated channel count. Access node 24A may continue subscribing to IPTV channels in accordance with the anticipated working set only if the current anticipated channel count is less than the maximum anticipated channel count.

If access node 24A determines a set of anticipated channels to request, and the number of channels in the set of anticipated channels exceeds the maximum anticipated channel count, access node 24A may prefer certain channels of the anticipated working set of channels over other channels in the anticipated working set of channels. As an example, access node 24A may prefer channels to which multiple subscribers have previously subscribed over channels to which only a single subscriber has previously subscribed. Access node 24A may then request channels which have been previously requested by multiple subscribers before requesting channels that have only been previously requested by a single subscriber.

Access node 24A may also unsubscribe to IPTV channels to which no subscribers are currently subscribed. As described above, access node 24A may subscribe to IPTV channels in accordance with the anticipated working set to which access node 24A predicts subscriber network 20A may subscribe, and add the requested channels from the anticipated working set. Access node 24A may periodically check each of the IPTV channels from the anticipated working set and determine whether any subscribers are actually subscribed to each anticipated channel. If there are no subscribers for an anticipated channel, access node 24A may remain subscribed to the IPTV channel until a hold period elapses. Once the hold period elapses, access node 24A may unsubscribe to an anticipated channel to which no subscribers are subscribed.

Unsubscribing from anticipated channels without subscribers after a hold period may also cause access node 24A to reduce the current anticipated channel count. In some cases, access node 24A may lower the current channel count to less than the value of the maximum channel count. When the current channel count is less than the maximum anticipated channel count, access node 24A may subscribe to additional anticipated channels to which subscriber network 20A is expected to subscribe. In addition, reducing the number of anticipated channels to which access node 24A is subscribed may also reduce the bandwidth associated with IPTV that access node 24A consumes.

Access node 24A, multicast servers 18, and subscriber networks 20 may utilize IGMP, as well as PIM (Protocol Independent Multicast) to manage the subscription of channels. Subscribers, such as one of CPE 30, may request an IPTV channel from access node 24A. CPE 30 may construct an IGMP join request packet. CPE 30 may send the packet to access node 24A. If access node 24A is subscribed to the multicast group associated with the channel, access node 24A may immediately fulfill the request of the subscriber for the channel. Otherwise, access node 24A propagates the IGMP join request through switch 26, and router 28. Router 28 may create one or more PIM join packets based on the IGMP join request, and forward the PIM join packets to one of multicast servers 18. Alternatively, access node 24A may construct a PIM message based on the received IGMP join request packet, and transmit the PIM packet to router 28, and router 28 may forward the PIM join request packet to one of multicast servers 18. Router 28 adds access node 24A to a multicast distribution table for the multicast group associated with the requested IPTV channel. The multicast server 18 then transmits the content using multicast to access node 24A and any other access nodes in the multicast distribution table of the multicast server 18 through router 28, and switch 26. Access node 24A receives the multicast content associated with the IPTV channel, and adds CPE 30 to the multicast distribution table of access node 24A. This multicast distribution table may indicate those multicast streams that multicast server 18 is to deliver to each of subscriber networks 20 coupled to access node 24A. The multicast distribution table may be stored with multicast group membership table and therefore reference to updating the multicast group membership table may indicate an update to the multicast distribution table. Access node 24A then fulfills the request of the subscriber for the IPTV channel and transmits the multicast content to CPE 30, and any other hosts in the multicast distribution table of access node 24A that have subscribed to this same IPTV channel.

In order for access node 24A to determine which of CPE 30 are subscribed to a particular IPTV channel, e.g. access node 24A may issue an IGMP membership query to those hosts, e.g. CPE 30, of subscriber networks 20. The IGMP membership query message may be useful in determining channels from which access node 24A should unsubscribe after the hold time interval has elapsed, as an example. The IGMP membership query message may solicit an IGMP membership report from CPE 30 that are members of an identified multicast group, e.g. subscribed to a particular IPTV channel to determine if any of CPE 30 are still subscribed to the particular IPTV channel. Those of CPE 30 that are members of the multicast group may respond to the membership query message by issuing another IGMP membership report message that lists the identified multicast group (IPTV channel) to which CPE 30 are currently subscribed. If no IGMP membership report messages are sent, access node 24A may determine that no other subscribers are requesting the IPTV channel and may unsubscribe from the IPTV channel so that access node 24A may request additional anticipated IPTV channels.

The IGMP standard also provides for an IGMP general query message that solicits from all CPE 30 connected to access node 24A, the above described IGMP membership report message. The IGMP general query message may also be used to determine channels from which access node 24A should unsubscribe after the hold time interval has elapsed. Access node 24A then correlates the multicast groups to which these CPE 30 are currently members into a table, compares this table against the multicast group membership table to identify lost IGMP leave messages, and updates the multicast group membership table based on the comparison.

However, as IGMP has quickly been adapted from a protocol to manage a small academic information sharing service in a time where bandwidth was of little concern to a massconsumer service in a time where service providers often oversubscribe bandwidth, certain deficiencies of IGMP have appeared under this more bandwidth sensitive application. For example, the IGMP standard does not require that access nodes 24 acknowledge an IGMP leave message and moreover does not require CPE 30 or IGMP hosts in general to resend an IGMP leave message. Thus, an IGMP host may send only a single IGMP leave message. If this IGMP leave message is lost, however, bandwidth inefficiencies may occur as access nodes 24 may not update the multicast group membership table to reflect the leave and therefore may continue to deliver this multicast stream associated with this multicast group to CPE 30 that do not consume the multicast content (as they have left the group).

Instead, the IGMP standard provides for an IGMP general query message. Access node 24A may also use the general query message to determine IPTV channels from which access node 24A should unsubscribe after the hold time interval has elapsed. The general query message that solicits from all CPE 30 connected to a particular one of access nodes 24, e.g., CPE 30 connected to access node 24A, the above described IGMP membership report message. Access node 24A then correlates the multicast groups (IPTV channels) to which these CPE 30 are currently members into a table, compares this table against the multicast group membership table to identify lost IGMP leave messages, and updates the multicast group membership table based on the comparison.

Access node 24A may also update the multicast distribution table in response to identifying a lost leave message. Upon identifying a lost leave message, access node 24A may update this multicast distribution table in some instances to reflect that none of CPE 30 of subscriber network 20A, for example, is currently consuming a particular one of the multicast streams associated with IPTV channels, as indicated in the multicast distribution table.

This process may have proved efficient in less bandwidth sensitive times where only a small number of devices were members of multicast groups, but in recent times, with the growth of IPTV in particular, possibly hundreds if not thousands of CPE 30 may connect to a single one of access nodes 24 and join and leave multicast groups. Soliciting membership report messages from each of these CPE 30, correlating the multicast groups indicated in the reports and comparing the correlated groups with those of the multicast group membership table may consume significant resources (e.g., processing power and memory space) of access nodes 24. Moreover, the hundreds, if not thousands, of membership reports sent by CPE 30, CPE 32, and/or CPE 34, in response to the general query may consume significant bandwidth. This overhead bandwidth may impact delivery of the IPTV service. Furthermore, to quickly detect these lost leave messages on the scale of IPTV multicast service, access nodes 24 would have to increase the frequency with which these normally periodic general query messages are sent, further increasing the bandwidth consumption over a set period of time.

In this way, the techniques described in this disclosure may enable an access node to use historical heuristics or usage patterns to determine to which IPTV channels to subscribe. More particularly, an access node coupled to a subscriber network may implement the techniques to determine which TV channels to deliver via an IPTV service to subscribers based on previously delivered channels to the subscribers within a given subscriber network. Considering the large amount of bandwidth each TV channel of an IPTV service consumes, the techniques may enable the access node to adaptively subscribe to IPTV channels based on historical subscriber subscription to IPTV channels such that the access node may not needlessly consume network bandwidth by subscribing to channels that users are not likely, based on this historical subscription to IPTV channels, to watch. Moreover, the techniques may further enable the access node to subscribe to those IPTV channels that are more likely to be requested as determined by this historical data defining previous subscription to IPTV channels prior to these IPTV channels actually being requested by the subscribers. In this way, the techniques may not only promote more efficient bandwidth usage but may also provide IPTV channels that are more likely to be requested to subscribers with reduced delay considering that the access node subscribes to these IPTV channels prior to the subscribers requesting these IPTV channels.

Figure 2:
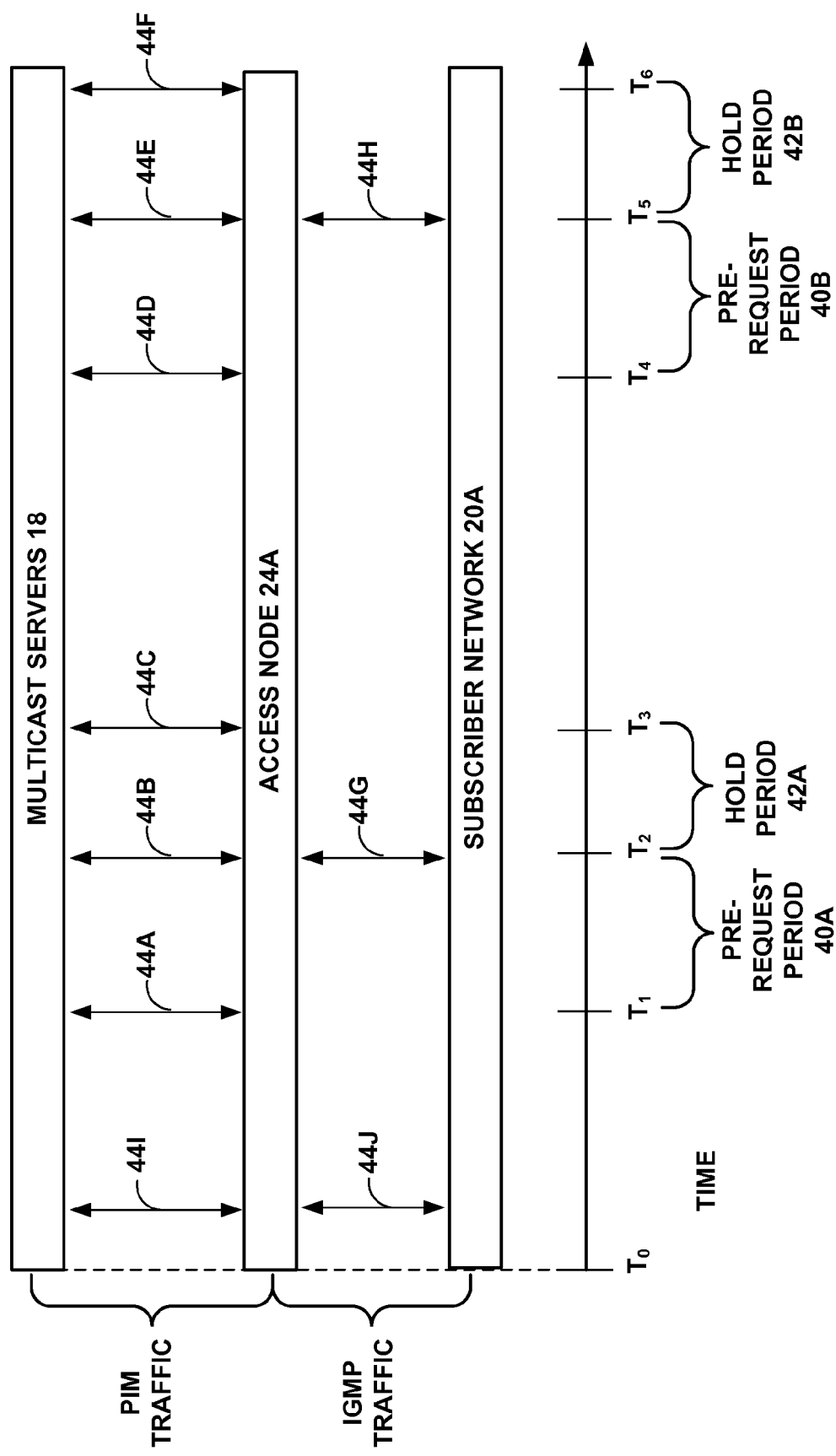
FIG. 2 is a conceptual diagram illustrating timing and messaging interactions among an access node that implements the techniques described in this disclosure, one or more multicast servers, and a subscriber network.

FIG. 2 is a conceptual diagram illustrating an example interaction between access node 24A, multicast server 18, and subscriber network 20A, all of FIG. 1, in which access node 24A implements techniques described in this disclosure. FIG. 2 illustrates IGMP traffic requests to subscribe to or unsubscribe from channels over time. Time is plotted on the x-axis. Vertical arrows 44A-44H represent IGMP traffic or PIM traffic, such as IGMP join requests or leave requests, or PIM join or prune requests associated with subscriber network 20A, requests from access node 24A to multicast servers 18, associated with subscribing to and unsubscribing from a channel. In some examples, access node 24A may create and transmit a PIM join request to multicast servers 18 based on an IGMP join request received from subscriber network 20A. In other examples, access node 24A may receive the IGMP join request, and may propagate IGMP requests to a router, e.g. router 28. Router 28 may receive the IGMP requests from access node 24A, and based on the IGMP join request, may create a PIM join request for the requested IPTV channel that the IGMP join request indicates.

The time scale of FIG. 2 begins at time $T_0$, which may represent the time that access node 24A is initialized. Access node 24A may be initialized after a reboot, power outage, or after reconfiguration, for example. Upon initialization, access node 24A is not subscribed to multicast groups associated with any IPTV channels. Between time $T_0$ and $T_1$, subscriber devices e.g. CPE 30 of subscriber network 20A, may request an IPTV channel from access node 24A using an IGMP join request 44J.

Access node 24A may receive the IGMP join request from subscriber network 20A. The IGMP join request may request that CPE 30 be subscribed to a particular channel. Because access node 24A is neither subscribed to any channels nor multicast groups associated with the channels, access node 24A generated a PIM join request for the multicast group that delivers the IPTV channel requested by the IGMP join request. Router 28 may add access node 24A to a multicast distribution table associated with the requested channel multicast group, and propagate the channels request to one or more of multicast servers 18. One of multicast servers 18 may then transmit the multicast channel content to access node 24A. Access node 24A may receive the requested channel, and may add the requesting CPE, i.e., CPE 30 in this example, of the subscriber network 20A to its own multicast distribution table, and fulfill the subscriber request.

At time $T_1$, access node 24A may determine an anticipated working set of IPTV channels to which subscriber network 20A is expected to subscribe based on one or more historical working sets. Access node 24A may then request the IPTV channels of the anticipated working set by transmitting one or more PIM requests to router 28. The requests for the IPTV channels of the current set are indicated by arrows 44A. Router 28 may propagate the requests to multicast servers 18.

Multicast servers 18 may receive the PIM requests, and may deliver the content associated with the requested IPTV channels in the manner described above with respect to arrows 44I. Access node 24A may then subscribe to the requested channels such that access node 24A may deliver the content associated with the requested IPTV channels to subscriber network 20A.

At time $T_2$, access node 24A expects that subscriber network 20A will request channels in accordance with the anticipated working set, which access node 24A may determine based on one or more historical working sets. As detailed above, the anticipated working set may be determined based on previous subscriptions of subscriber network 20A indicated by one or more historical working sets. Requests for channels at time $T_2$ from subscriber network 20A are indicated by arrows 44B and 44G. Arrow 44G indicates requests from subscriber network 20A to access node 24A. Access node 24A may already be subscribed to the channel requested, and may be able to immediately fulfill these channel request. Access node 24A may not be able to fulfill requests of subscriber network 20A for channels not in the anticipated working set. As a result, access node 24A may request the channels from router 28 and may generate and transmit a PIM request for the IPTV channel requested in IGMP request 44G to router 28. Router 28 may propagate the request for the requested IPTV channel to one of multicast servers 18. The PIM join request that access node 24A generates may be indicated by arrows 44B. Multicast servers 18 may fulfill the request of access node 24A, which may also be indicated by arrows 44B. Access node 24A may receive the requested channels fulfill the request of subscriber network 20A using IGMP, which may be indicated by arrows 44G.

As described above, access node 24A may be configured with a pre-request period 40A. The pre-request period comprises units of time between the time $T_1$ at which access node 24A determines an anticipated working set, and the time $T_2$ at which subscriber network 20A is expected to subscriber to the channels of the anticipated working set.

Access node 24A may remain subscribed to channels of the anticipated working set to which subscriber network 20A is expected to subscribe for the duration of a hold period 42A after time $T_2$. Once the hold period has elapsed, access node 24A may unsubscribe from channels of the anticipated working set to which access node 24A expected subscribers to subscribe, but to which no subscribers, e.g. none of CPE 30, are currently subscribed. Arrows 44C at time $T_3$ may indicate PIM requests to unsubscribe from Access node 24A the channels with no subscribers from access node 24A to router 28. Router 28 propagates the requests to unsubscribe to multicast servers 18. Multicast servers 18 may remove access node 24A from the multicast groups associated with channels to which subscriber network 20A is not currently subscribed. Upon unsubscribing from the channels to which subscriber network 20A is not currently subscribed, access node 24A may decrement the current anticipated channel count.

The sequence of subscribing to anticipated channels at a pre-request interval before subscriber network 20A is expected to request a different set of channels, holding those channels and releasing unsubscribed channels may repeat periodically in a cycle. That is, the time between $T_1$ and $T_4$, $T_2$ and $T_5$, and $T_3$ and $T_6$, may be a constant time period. In some examples the period between each cycle may be 15, 30, or 60 minutes (1 hour). As examples of a second cycle in FIG. 2, time $T_4$ indicates the beginning of a second pre-request hold period 40B. Arrows 44D indicate IGMP join request messages for channels to which subscriber network 20A is expected to subscribe. Time $T_4$ indicates a second time at which subscriber network 20A determines a new anticipated working set of channels from access node 24A. At time $T_5$, Access node 24A subscribes to the channels of the anticipated working set, which indicates the end of the pre-request period 40B. The interval between $T_4$ and $T_5$ may be the same as or different than the time interval between $T_1$ and $T_2$, which comprises pre-request hold period 40A. Access node 24A remains subscribed to the channels of the anticipated working set during hold period 42B, which begins at time $T_5$ and ends at time $T_6$. The interval of time comprising hold period 42B may be the same as or different than hold period 42A.

The IGMP requests for channels from subscriber network 20A are indicated by arrows 44H. Access node 24A may create PIM requests for channels based on IGMP Requests for channels to which access node 24A is not currently subscribed. Access node 24A may transmit the PIM request to router 28, which may propagate the requests to multicast servers 18, indicated by arrows 44E. Time $T_6$ indicates an end of a second hold period, after which access node 24A may unsubscribe from channels without subscribers. IGMP traffic associated with unsubscribing from channels is indicated by arrows 44F. Although not illustrated in FIG. 2, additional IGMP messages, such as IGMP join requests for channels, may occur at times other than those illustrated in FIG. 2.

More information concerning IGMP messages and general IGMP operation can be found in one or more of three version of a standard defining IGMP. The first version of the IGMP standard, referred to commonly as IGMPv1, is set out in Request For Comments (RFC) 1112, entitled "Host Extensions for IP Multicasting," by S. Deering, dated August 1989, herein incorporated by reference in its entirety. The second version of the IGMP standard, referred to commonly as IGMPv2, is set out in RFC 2236, entitled "Internet Group Management Protocol, Version 2," by W. Fenner, dated November 1997, herein incorporated by reference in its entirety. The third version of the IGMP standard, referred to commonly as IGMPv3, is set out in RFC 3376, entitled "Internet Group Management Protocol, Version 3," by B. Cain et al., dated October 2002, herein incorporated by reference in its entirety.

Figure 3:
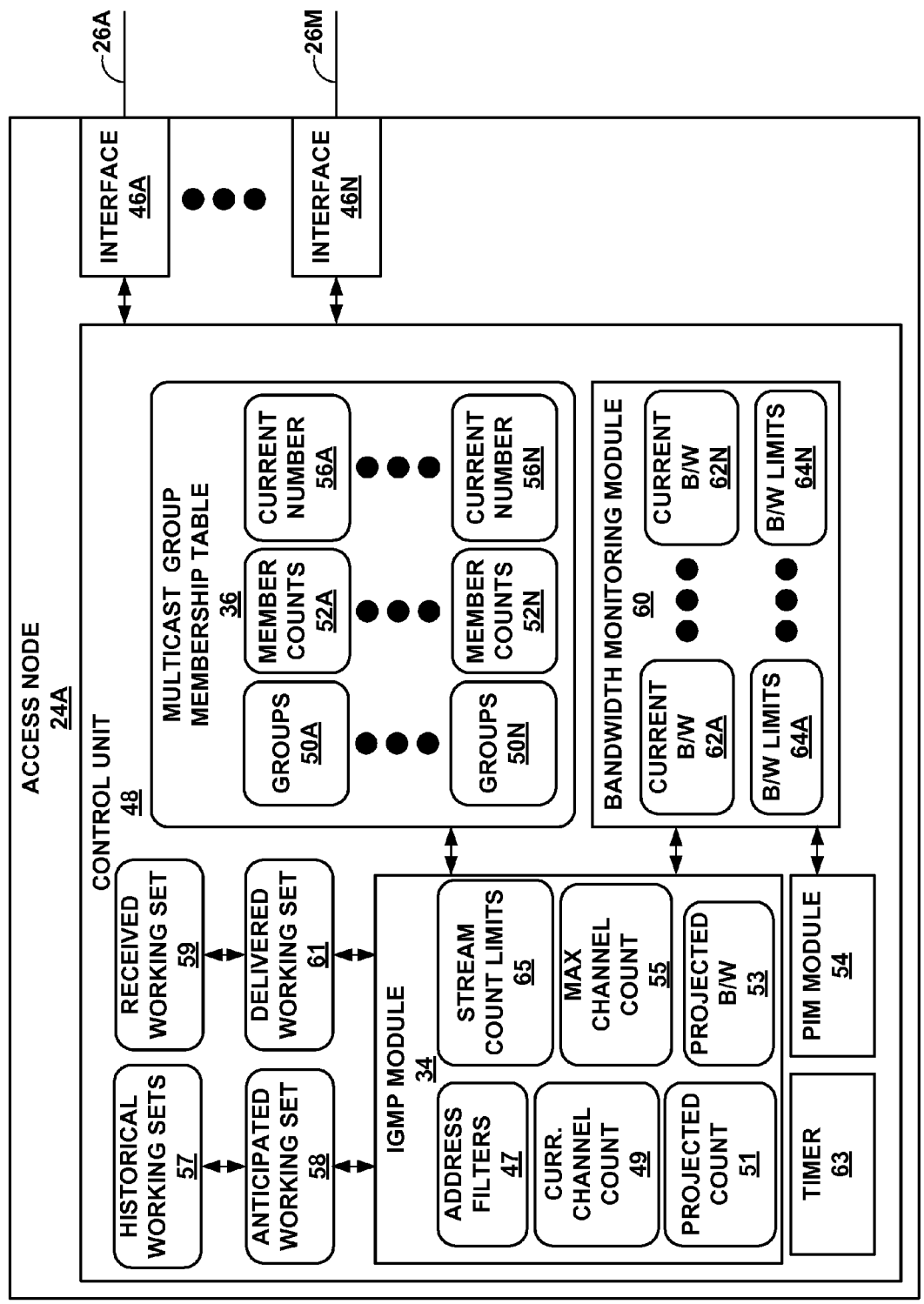
FIG. 3 is a block diagram illustrating, in more detail, an example access node that implements the techniques described in this disclosure.

FIG. 3 is a block diagram illustrating, in more detail, an example embodiment of access node 24A shown in FIGS. 1 and 2 that implements the techniques described in this disclosure. While the techniques are described below with respect to one of access nodes 24 of FIG. 1, each of access nodes 24 may comprise similar components to those described below with respect to access node 24A. In this respect, the techniques are described with respect to access node 24A for ease of illustration purposes.

As shown in FIG. 3, access node 24A includes interfaces 46A-46N ("interfaces 46") that couple to respective dedicated subscriber lines 26A-26N, which in turn couple to respective subscriber networks 20A-20N. Interfaces 46 may comprise ports of one or more interface cards (not shown in FIG. 3). Alternatively, for shared subscriber lines, interfaces 46 may comprise virtual interfaces to VLANs or other virtual networks. These virtual interfaces may comprise virtual ports or other abstractions that enable one physical port to virtually represent multiple ports through use of VLAN tags or other identifiers that enable distinction among virtual networks.

Access node 24A also includes a control unit 48 that couples to each of interfaces 46. Control unit 48 may comprise one or more processors (not shown in FIG. 3) that execute software instructions, such as those used to define a software or computer program, stored in a computer-readable storage medium (again, not shown in FIG. 3), such as a storage device (e.g., a disk drive, or an optical drive), or memory (e.g., a Flash memory, random access memory or RAM) or any other type of volatile or non-volatile memory that stores instructions (e.g., in the form of a computer program or other executable) to cause a programmable processor to perform the techniques described in this disclosure. Alternatively, control unit 48 may comprise dedicated hardware, such as one or more integrated circuits, one or more Application Specific Integrated Circuits (ASICs), one or more Application Specific Special Processors (ASSPs), one or more Field Programmable Gate Arrays (FPGAs), or any combination of the foregoing examples of dedicated hardware, for performing the techniques described in this disclosure.

Control unit 48 may include IGMP module 34, which may implement IGMP in accordance with one or more of the three versions of the IGMP standard, as described above. IGMP module 34 may store data defining address filters 47, a minimum limit 49, a projected stream count 51 ("projected count 51"), a projected bandwidth 53 ("projected B/W 53"), a maximum anticipated channel count 55. IGMP module 34 may apply address filters 47 to filter one or more multicast groups and related streams from certain portions of data stored within multicast group membership table 36. For example, IGMP module 34 may apply address filters 47 when updating current numbers 56 such that current numbers 56 only reflects streams related to IPTV service rather than multicast stream related to a data or VoIP service (e.g., or a video telephony service). An administrator or other user may configure address filters 47, current anticipated channel count 49, and maximum anticipated channel count 55, via a user interface presented by a user interface module of control unit 48 (not shown in FIG. 3).

Control unit 48 also includes multicast group membership table 36 that stores data defining groups 50A-50N ("groups 50"), member counts 52A-52N ("member counts 52"), threshold values 54A-54N ("threshold values 54") and a current number 56A-56N ("current numbers 56"). Groups 50 each represent data defining one or more multicast groups to which each respective one of subscriber networks 20A-20N belong. Member counts 52 each represent data specifying a count or number of members of CPE 30 subscribed to the groups defined by respective one of groups 50. Current number 56 each represents a current number of multicast streams being delivered to a corresponding one of subscriber networks 20A-20M.

While not shown explicitly in FIG. 3, multicast group membership table 36 may comprise one entry for each interface 46. For example, a first entry may be associated with interface 46A and store data defining groups 50A, member counts 52A, and a current number 56A, all of which relate to subscriber network 20A coupled via subscriber line 26A to interface 46A. As another example, a second entry may be associated with interface 46B and store data defining groups 50B, member counts 52B, and a current number 56B, all of which relate to subscriber network 20B coupled via subscriber line 26B to interface 46B. These entries may be accessed within multicast group membership table 36 using an interface identifier, such as a port number. In other words, the entries may be indexed in accordance with the interface identifier.

Control unit 48 may further include historical working sets 57 that store previous subscription data of channels previously delivered to one or more subscriber networks, such as subscriber networks 20A-20N. Control unit 48 may also include a delivered working set 61, which contains information that indicates a set of channels to which subscriber networks 20A-20N are currently subscribed. Control unit 48 may periodically store the information of the delivered working set 61 as one of historical working sets 57. Control unit 48 may determine an anticipated working set 58 of IPTV channels based on one or more historical working sets 57. Control unit 48 may request and subscribe to the channels of the anticipated working set 58, as described above. Control unit 48 may add the subscribed channels of anticipated working set 58 to received working set 59. Received working set working set 59 may include data that describes IPTV channels to which access node 24A is currently subscribed. In some examples, Access node 24A may receive requests from subscriber networks 20A-20N for channels that access node 24A is not currently subscribed to, i.e. not currently in the received working set 59. Access node 24A may request and subscribe to the channels requested by subscriber networks 20A-20N, and may update received working set 59 to include the channels requested by subscriber networks 20A-20N.

When subscribing to channels, such as channels indicated by anticipated working set 58, or received from one of subscriber networks 20A-20N, control unit 48 may issue PIM requests with PIM module 54 to request the IPTV channels of received working set 59. Control unit 48 may transmit the channel requests to router 28, which may propagate the requests to multicast servers 18. Multicast servers 18 may provide the media content associated with the requested channels to access node 24A. Upon receiving the requested media content from multicast servers 18, control unit 48 may add the requested channels to received working set 59.

As described above with respect to FIG. 2, control unit 48 may request channels of anticipated working set 58 at some pre-request interval before subscriber networks 20A-20N are expected to request the expected television channels. Also, responsive to receiving an IGMP join request for IPTV channels to which access node 24A is not currently subscribed from one or more of subscriber networks 20A-20N, control unit 48 may generate a PIM join request with PIM module 54 for the requested IPTV channels based on the IPTV channels indicated in the IGMP request.

Control unit 48 may also include a timer 63. Control unit 48 may use the timer 63 to determine the start and end of a pre-request period, and the beginning and end of a hold period. At the start of the pre-request period, control unit 48 may requests channels of the anticipated working set 58 such that the media content associated with the channels of the anticipated working set 58 is available for delivery to subscriber networks 20A-20N at times during which access node 24A expects subscriber networks 20A-20N to subscribe to the different set of the plurality of channels defined by the anticipated working set 58. In an example, the times at which access node 24A expects subscriber networks 20A-20N to subscribe to the set of channels of the anticipated working set 58 may begin at the start of the hold period. Control unit 48 may use the timer 63 to determine the start and end of the hold period. Control unit 48 may subscribe to the different set of the plurality of channels at the beginning of the hold period. Control unit 48 may continue to subscribe to, i.e. hold on to, the channels of the anticipated working set 58 until the end of the hold period before determining whether to unsubscribe from the channels of the anticipated working set 58 to which no subscribers have subscribed.

When control unit 48 requests IPTV channels, control unit 48 may increment the current channel count 49 by the number of additional channels of the anticipated working set 58 to which access node 24A has subscribed. Once a hold period has elapsed, PIM module 54 may unsubscribe from channels of anticipated working set 58 to which subscriber networks 20A-20N are currently not subscribed, and may decrease the current anticipated channel count 49. PIM module 54 may determine that a channel of anticipated working set 58 has no subscribers based on one of member counts 52A-52N associated with one of groups 50A-50N, associated with the channel. PIM module 54 may decrement the current anticipated channel count by the number of channels unsubscribed.

In addition to PIM module 54, control unit 48 may also include a bandwidth monitoring module 60 that represents a hardware and/or software module that monitors bandwidth utilization over each of subscriber lines 26A-26N. Bandwidth monitoring module 60 may store data defining the above mentioned current bandwidths 62, as well as bandwidth limits 64A-64N ("B/W limits 64"). Bandwidth monitoring module 60 may determine the current consumption of total bandwidth for each of subscriber lines 26 and store this current consumption as a percentage or some other relative measure as current bandwidths 62. Bandwidth monitoring module 60 may also store bandwidth limits 64 that each provide one or more limits that cap bandwidth usage for a respective one or more services, such as IPTV service, data service and VoIP service.

Bandwidth monitoring module 60 may store bandwidth limits 64 for each one of subscriber networks 20A-20N and associate each one of bandwidth limits 64 with a respective one of interfaces 46. Typically, each of bandwidth limits 64 reflects limits contracted for by the respective subscriber when subscribing to the respective services offered by the service provider. That is, the subscriber may desire only standard definition IPTV service for two televisions and the subscriber may set overall bandwidth limits for this form of IPTV service. For subscribers that desire High-Definition Television (HDTV) IPTV service, the service provider may set much higher overall bandwidth limits. Bandwidth limits 64 may be more relevant for shared subscriber lines so as to assure that two subscribers who share a single shared subscriber line receive their contracted for level of service, although bandwidth limits 64 may be applied to non-shared instances as well.

Bandwidth monitoring module 60 may configure bandwidth-based limits, e.g., bandwidth limits 64. When configured in this manner, bandwidth monitoring module 60 may perform the additional checks described above to enforce these limits 60. While described with respect to bandwidth limits, other types of limits including stream count limits may be used to cap usage for these services, as described above.

Figure 4:
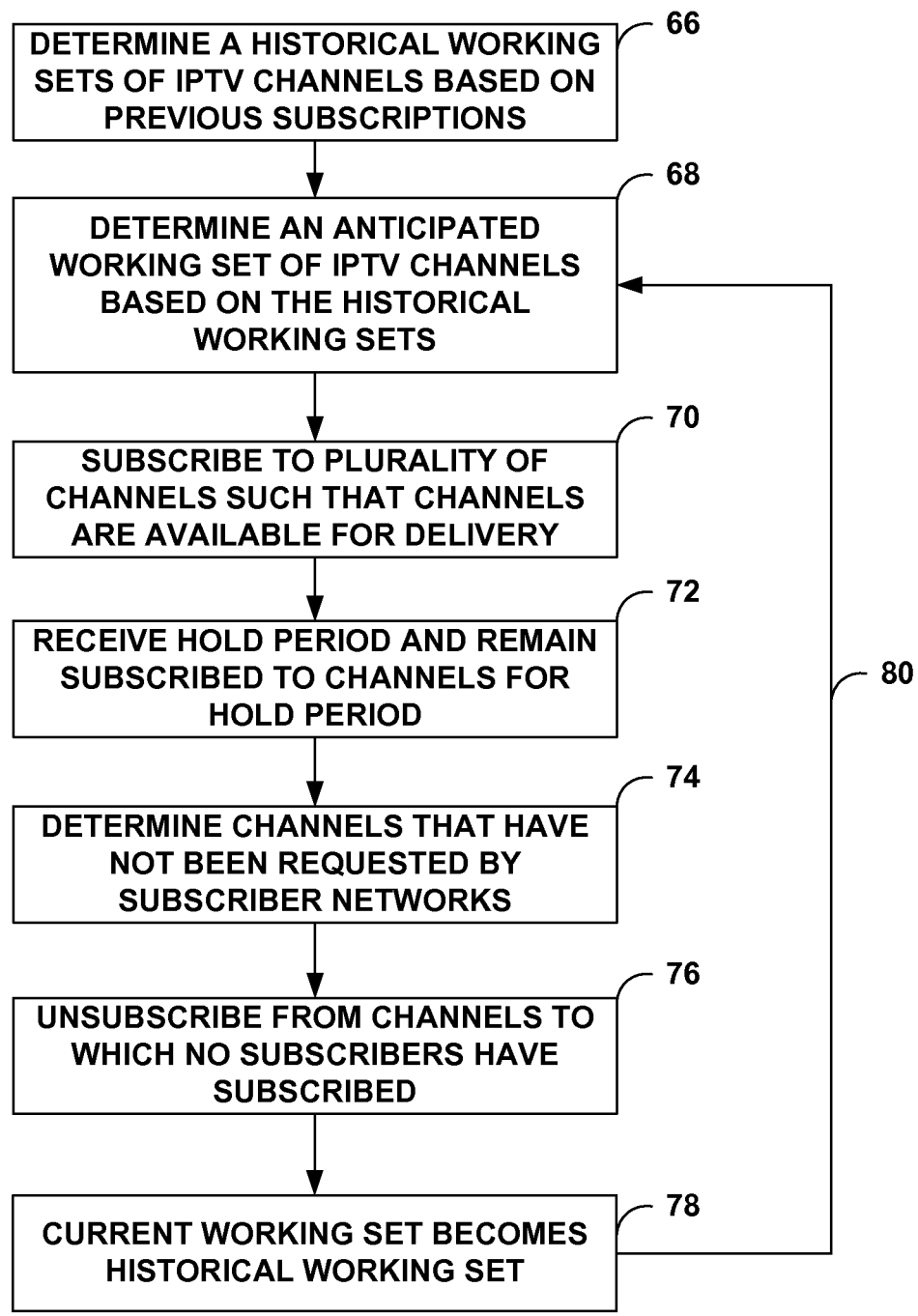
FIG. 4 is a flowchart illustrating exemplary operation of a network device in implementing the techniques described in this disclosure.

FIG. 4 is a flowchart illustrating operation of a network device, such as access node 24A shown in the example of FIGS. 1-3, in implementing the techniques described in this disclosure. While described with respect to a particular network device, e.g., access node 24A, and a particular implementation of that network device, e.g., access node 24A as shown in FIG. 3, the techniques may be implemented by any network device that manages multicast group memberships for delivery of multicast streams to members of the multicast group.

Referring to FIG. 4, control unit 48 of access node 24A may determine historical working sets 57 (66). The historical working sets 57 may comprise records of IPTV channels to which at least one of subscriber networks 20A-20N have previously subscribed. Control unit 48 may adaptively determine an anticipated working set 58 of a plurality of IPTV channels based on historical working sets 57 (68). The anticipated working set 58 indicates a specific time at which the at least one of subscriber networks 20A-20N is expected to subscribe to different sets of the plurality of IPTV channels.

Table 1 illustrates observed subscriber activity, e.g. requests for a number of channels (CH1, CH2, CH3, and CH4) at 5 p.m. over a four day period of a first week. The number in each cell of the table indicates a number of subscriber requests for each of the television channels. The subscriber activity may comprise one or more of historical sets 57. Once a historical working set 57 is created, control unit 48 of access node 24A can apply heuristics to determine an anticipated working set 58 going forward that includes a non-zero subset of the overall channel lineup. Access node 24A may adapt the anticipated working set 58, as well as the received working set 59 using hold periods, maximum channel counts 55, bandwidth limits 64A, and stream limit counts 65.

TABLE 1

|  | Mon. 5:00 pm | Tues. 5 pm | Wed. 5 pm | Thur. 5 pm |
|---|---|---|---|---|
| CH1 | 5 | 2 | 8 | 2 |
| CH2 | 0 | 3 | 0 | 3 |
| CH3 | 3 | 0 | 0 | 2 |
| CH4 | 1 | 1 | 4 | 2 |

Prior to the specific time at which the one of subscriber networks 20A-20N is expected to subscribe to the different sets of the plurality of television channels, access node 24A may subscribe to a corresponding one of the sets of the plurality of television channels in accordance with anticipated working set 58 such that media content associated with the corresponding one of the plurality of television channels is available for delivery to the at least one of subscriber networks 20A-20N at the specific time during which access node 24A expects the at least one of subscriber networks 20A-20N to subscribe to the corresponding one of the different sets of the plurality of television channels.

The specific time at which access node 24A subscribes to the different sets of the plurality of television channels may occur at a pre-request interval. Access node 24A may determine the pre-request interval that indicates how many units of time before the specific time at which the at least one of subscriber networks 20A-20N is expected to subscribe to the different sets of the plurality of television channels that access node 24A is to subscribe to the corresponding different sets of the plurality of television channels defined by the anticipated working set 58. Subscribing to the corresponding one of the different sets of the plurality of television channels may comprise: at the units of time indicated by the pre-request time interval before the specific time at which the at least one of subscriber networks 20A-20N is expected to subscribe to the different sets of the plurality of television channels specified by the anticipated working set 58, subscribing to the corresponding one of the different sets of the plurality of television channels in accordance with the anticipated working set 58 such that the media content associated with the corresponding one of the different sets of the plurality of television channels defined by the anticipated working set 58 is available for delivery to the at least one of subscriber networks 20A-20N at the specific time during which access node 24A expects at least one of subscriber networks 20A-20N to subscribe to the corresponding one of different sets of the plurality of television channels defined by the anticipated working set 58.

Access node 24A may adaptively determine the anticipated working set 58 of the plurality of television channels. To adaptively determine the anticipated working set 58, access node 24A may determine a received working set 59 of the plurality of television channels for which access node 24A is currently retrieving media data at a first time. Access node 24A may determine the anticipated working set 58 of the plurality of television channels as a difference between the received working set 59 of the plurality of television channels and the historically delivered working set 57 of the plurality of television channels at a second time. Responsive to subscribing to the different set of the plurality of channels of the anticipated working set 58, access node 24A may update the plurality of channels of the received working set 59 to include the plurality of channels of the anticipated working set 58.

Access node 24A may adaptively determine the anticipated working set 58 of the plurality of television channels by determining a received working set 59 of the plurality of television channels for which the access node 24A is currently retrieving media data at a first time; and determine the anticipated working 58 set of the plurality of television channels as a difference between the received working set 59 of the plurality of television channels and the historically delivered working set 57 of the plurality of television channels at the specific time. In some examples, the specific time may be a multiple of one of 15 minutes, 30 minutes, and 60 minutes.

Table 2, below, is an example of an anticipated working set 58 that access node 24A may adaptively determine. Based on the channels (CH1, CH2, CH3, and CH4) that subscribers subscribed to in the first week, illustrated in Table 1, which comprises one of historical working sets 57, control unit 48 of access node 24A may determine an anticipated working set 58 of channels of which to subscribe during a second week. After obtaining the first week of subscription data, the anticipated working set 58 reflects the channels that customers subscribed to during the previous week. In table 2, a "Y" indicates that control unit 48 should subscribe to a particular channel such that the media associated with the channel is available at the times that the at least one subscriber networks 20A-20N are expected to subscribe to the channel. An "N" indicates that a particular channel is not part of the anticipated working set 58 at a particular time, and that control unit 48 should not request the channel at the particular time.

TABLE 2

|     | Mon. 5:00 pm | Tues. 5 pm | Wed. 5 pm | Thur. 5 pm |
| --- | --- | --- | --- | --- |
| CH1 | Y | Y | Y | Y |
| CH2 | N | Y | N | Y |
| CH3 | Y | N | N | Y |
| CH4 | Y | Y | Y | Y |

The anticipated working set 58 of the plurality of television channels may indicate that, at a time of a day, the at least one of subscriber networks 20A-20N is expected to subscribe to a first one of the different sets of the plurality of television channels. The at least one subscriber network 20A-20N may have previously subscribed to the historical working set 57 at the same time of a same day one or more weeks prior to the specific time of the same day. Access node 24A may update the anticipated working set 58 of the plurality of television channels to replace the first one of the different sets of the plurality of television channels with the determined current one of the plurality of television channels.

Tables 3 and 4, below illustrate the process of updating the anticipated working set 58 to reflect channels to which subscribers have previously subscribed based on historical working sets 57. Below, Table 3 illustrates the channels that subscribers actually subscribed to during the second week. Subscription changes relative to the previous week are highlighted. Access node 24A may store the subscription data for the second week as one or more of historical working sets 57.

TABLE 3

|     | Mon. 5:00 pm | Tues. 5 pm | Wed. 5 pm | Thur. 5 pm |
| --- | --- | --- | --- | --- |
| C1  | 0 | 2 | 0 | 2 |
| C2  | 0 | 3 | 0 | 0 |
| C3  | 3 | 2 | 0 | 2 |
| C4  | 1 | 1 | 7 | 2 |

Based on one of historical working sets 57, such as the historical working set illustrated in table 3, which contains data that indicates to which channels subscribers actually subscribed, control unit 48 of access node 24A may update the anticipated working set 58 to include the channels of historical working set 57 which were previously delivered to subscribers. The new anticipated working set 58 is illustrated below in Table 4. Changes to the anticipated working set relative to the previous anticipated working set illustrated in Table 2 are highlighted.

TABLE 4

|     | Mon. 5:00 pm | Tues. 5 pm | Wed. 5 pm | Thur. 5 pm |
| --- | --- | --- | --- | --- |
| C1  | N | Y | N | Y |
| C2  | N | Y | N | N |
| C3  | Y | Y | N | Y |
| C4  | Y | Y | Y | Y |

Access node 24A may continue to update the anticipated working set 58 based on historical working sets 57 in response to determining historical subscription data of subscribers to channels as described above with respect to Tables 1-4.

When access node 24A subscribes to a plurality of channels in accordance with the anticipated working set 58, working set 58 may include one or more of the plurality of television channels such that a number of the one or more of the plurality of television channels included within the anticipated working set 58 does not exceed a maximum anticipated channel count. Access node 24A may determine the maximum anticipated channel count, e.g. via a network, programming or configuration interface, or the maximum channel count may be pre-programmed. The maximum anticipated channel count may identify a maximum number of the plurality of television channels included within the anticipated working set 58 of the plurality of television channels. The anticipated working set 58 may include one or more of the plurality of television channels such that a number of the one or more of the plurality of television channels included within the anticipated working set 58 does not exceed the maximum anticipated channel count.

If the number of channels included in anticipated working set 58 exceeds the maximum anticipated channel count, access node 24A may request those channels of the anticipated working set that have been requested by multiple subscribers of subscriber networks 20A-20N before requesting those channels of the anticipated working 58 set that have been requested only by a single subscriber of the at least one subscriber networks 20A-20N. As an example from Table 4, control unit 48 may request channels requested by multiple subscribers, e.g. CH3 at 5 p.m. on Monday, before requesting channels with only a single subscriber, e.g. CH4 at 5 p.m. on Monday.

Access node 24A may issue IGMP requests with IGMP module 34 to determine which channels at least one of subscriber networks 20A-20N are not currently subscribed (74).

Access node 24A may determine a hold time interval, e.g. via a configuration interface. The hold time interval may indicate how many units of time after the times at which the different sets of the plurality of television channels are expected to be requested that the access node 24A is to wait before unsubscribing from those of the corresponding different sets of the plurality of IPTV channels defined by the anticipated working set 58 that have not been requested by the corresponding one of the at least one of subscriber networks 20A-20N. Once the hold time interval has elapsed, access node 24A may unsubscribe from the IPTV channels of the anticipated working set 58 to which no subscribers are currently subscribed (76). Access node 24A may save one or more historical working sets 57 based on the delivered working set 61 (78). Access node 24A may continue to perform the techniques of FIG. 4, beginning with determining an anticipated working set 57 of IPTV channels based on historical working sets 57 and the delivered working set 61 (80).

In some examples, access node 24A may subscribe to the sets of channels by transmitting at least one of Protocol Independent Multicast (PIM) message or Internet Group Management Protocol (IGMP) message. Additionally, access node 24A may also comprise one of a Digital Subscriber Line Access Multiplexer (DSLAM), a Cable Modem Termination System (CMTS), or an Optical Line Terminal (OLT), and each of the plurality of channels may comprise different channels of an Internet Protocol Television (IPTV) service.

The order of the flowchart steps as shown in FIG. 4 should not be construed as specifying the order of operation with respect to various aspects of the disclosure, unless noted otherwise. The steps of the flowchart may merely represent steps taken by one implementation of the techniques.

The techniques are described above with respect to various L2 and L3 network architectures for purposes of illustration. For example, service provider network 16 may be owned and operated by a telephone service provider that has expanded to offer various network or data services. In this example, service provider network 16 comprises a L2 access network 22 in which DSLAMs 24 provide access to subscriber networks 20. The techniques of this disclosure may be implemented by cable service providers who own and operate a L3 service provider network that includes a hybrid L2/L3 access network 22 in which CMTSes 24 provide access to subscriber networks 20.

The techniques may also be implemented with respect to other network architectures, including, as yet another example, Gigabyte Passive Optical Networks (GPONs) or any other type of PON or Active Ethernet (AE) optical network. In this example, a telephone or other service provider may implement a L2 or L3 access network in which access nodes 24 comprise Optical Line Terminals (ONTs) that facilitate access by Optical Node Terminals (ONTs) located at each of the subscriber premises. Each of the ONTs convert traffic or network data received from subscriber networks 20 into optical signals and deliver these optical signals upstream to OLTs 24, which then transmit multiple optical signals upstream to switch 26.

In many instances, one or more of these network architectures may be intermixed to provide a hybrid service provider network 16. For example, in a hybrid fiber coaxial network, subscriber lines 26 may comprise optical fiber lines and access nodes 24 may represent OLTs. Each of subscriber networks 20 may comprise ONTs for the reason described above. However, access network 22 may also include a CMTS sitting behind each of the OLTs and the OLTs may convert the optical signals back into RF signals for delivery over coaxial cable to the CMTS, which then forwards the data upstream to router 28 for delivery to public network 14. Thus, while described with respect to a particular network architecture, the techniques may be implemented with respect to any network architecture and should not be limited to any one network architecture described in this disclosure.

The techniques described herein may be implemented in hardware, software, firmware, or any combination thereof. Any features described as modules, units or components may be implemented together in an integrated logic device or separately as discrete but interoperable logic devices. In some cases, various features may be implemented as an integrated circuit device, such as an integrated circuit chip or chipset. If implemented in software, the techniques may be realized at least in part by a computer-readable medium comprising instructions that, when executed, cause a processor to perform one or more of the methods described above.

A computer-readable medium may form part of a computer program product, which may include packaging materials. A computer-readable medium may comprise a computer data storage medium such as random access memory (RAM), synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates code in the form of instructions or data structures and that can be accessed, read, and/or executed by a computer.

The code or instructions may be executed by one or more processors, such as one or more DSPs, general purpose microprocessors, ASICs, field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated software modules or hardware modules. The disclosure also contemplates any of a variety of integrated circuit devices that include circuitry to implement one or more of the techniques described in this disclosure. Such circuitry may be provided in a single integrated circuit chip or in multiple, interoperable integrated circuit chips in a so-called chipset.

Various examples of the techniques of this disclosure have been described. These and other examples are within the scope of the following claims.

What is claimed is:

1. A method performed by an access node coupled to at least one subscriber network, the method comprising:
adaptively determining an anticipated working set of a plurality of television channels for a plurality of subscribers of the at least one subscriber network based on a historically delivered working set of television channels comprising those of the plurality of television channels to which the plurality of subscribers of at least one subscriber network has previously subscribed, wherein the anticipated working set:
specifies a different set of the plurality of television channels to which the plurality of subscribers of the at least one subscriber network is expected to subscribe at a specific time, and
includes one or more of the plurality of television channels such that a number of the one or more of the plurality of television channels included within the anticipated working set does not exceed a maximum anticipated channel count that identifies a maximum number of the plurality of television channels included within the anticipated working set of the plurality of television channels; and prior to the specific time at which the plurality of subscribers of the subscriber network is expected to subscribe to the different set of the plurality of television channels, subscribing to the different set of television channels specified by the anticipated working set such that media content associated with the different set of the plurality of television channels specified by the anticipated working set is available for delivery to the plurality of subscribers of the at least one subscriber network at the specific time during which the access node expects the plurality of subscribers of the at least one subscriber network to subscribe to the different set of the plurality of television channels; wherein subscribing to the different set of television channels comprises:

if a number of the plurality of television channels included in the anticipated working set exceeds the maximum anticipated channel count, requesting those channels of the anticipated working set that have been requested by multiple subscribers of the plurality of subscribers of the at least one subscriber network before requesting those channels of the anticipated working set that have been requested only by a single subscriber of the plurality of subscribers of the at least one subscriber network.

2. The method of claim 1, wherein adaptively determining the anticipated working set of the plurality of television channels comprises:

determining a received working set of the plurality of television channels for the plurality of subscribers of the at least one subscriber network for which the access node is currently retrieving media data at a first time; and determining the anticipated working set of the plurality of television channels for the plurality of subscribers of the at least one subscriber network as a difference between the received working set of the plurality of television channels and the historically delivered working set of the plurality of television channels at the specific time.

3. The method of claim 2, further comprising, responsive to subscribing to the different set of the plurality of television channels of the anticipated working set, updating the plurality of television channels of the received working set to include the plurality of television channels of the anticipated working set.

4. The method of claim 2, wherein the specific time comprises one of 15 minutes, 30 minutes and 60 minutes or a multiple thereof.

5. The method of claim 1, wherein the plurality of subscribers of the at least one subscriber network has previously subscribed to the historically delivered working set of television channels at the same time of a same day one or more weeks prior to the specific time of the same day.

6. The method of claim 1, further comprising determining a pre-request time interval indicating how many units of time before the specific time at which the plurality of subscribers of the at least one subscriber network is expected to subscribe to the different set of the plurality of television channels that the access node is to subscribe to the different set of the plurality of television channels defined by the anticipated working set of the plurality of television channels, wherein subscribing to the different set of the plurality of television channels comprises, at units of time indicated by a pre-request time interval before the specific time at which the plurality of subscribers of the at least one subscriber network is expected to subscribe to the different set of the plurality of television channels specified by the anticipated working set, subscribing to the different set of the plurality of television channels in accordance with the anticipated working set of the plurality of television channels such that the media content associated with the different set of the plurality of television channels defined by the anticipated working set of the plurality of television channels is available for delivery to the plurality of subscribers of the at least one subscriber network at the specific time during which the access node expects the plurality of subscribers of the at least one subscriber network the at least one subscriber network to subscribe to the different set of the plurality of television channels defined by the anticipated working set.

7. The method of claim 1, further comprising determining a hold time interval that indicates how many units of time after the specific time at which the different set of the plurality of television channels are expected to be requested that the access node is to wait before unsubscribing from those television channels of the different set of the plurality of television channels defined by the anticipated working set of the plurality of television channels that have not been requested by the at least one subscriber network.

8. The method of claim 7, the method further comprising:

determining one or more of the plurality of television channels identified by the anticipated working set of the plurality of television channels that has not been requested by the at least one subscriber network; and unsubscribing from the determined one or more of the plurality of television channels that has not been requested.

9. The method of claim 8, wherein determining the one or more channels that have not been requested by the at least one subscriber network comprises sending at least one of an IGMP report message request, and an IGMP general query message to the at least one subscriber network.

10. The method of claim 1, wherein subscribing to the different set of television channels comprises transmitting, with the access node, at least one of an Internet Group Management Protocol (IGMP) message and a Protocol Independent Multicast (PIM) message, wherein the access node comprises one of a Digital Subscriber Line Access Multiplexer (DSLAM), a Cable Modem Termination System (CMTS), or an Optical Line Terminal (OLT), and wherein each of the plurality of television channels comprise different television channels of an Internet Protocol Television (IPTV) service.

11. An access node coupled to at least one subscriber network, wherein the access node comprises:

a control unit that adaptively determines an anticipated working set of a plurality of television channels for a plurality of subscribers of the at least one subscriber network based on a historically delivered working set of television channels comprising those of the plurality of television channels to which the plurality of subscribers of the at least one subscriber network has previously subscribed, wherein the anticipated working set:

specifies a different set of the plurality of television channels to which the plurality of subscribers of the at least one subscriber network is expected to subscribe at a specific time, and includes one or more of the plurality of television channels such that a number of the one or more of the plurality of television channels included within the anticipated working set does not exceed a maximum anticipated channel count that identifies a maximum number of the plurality of television channels included within the anticipated working set of the plurality of television channels; and at least one interface that couples the access node to the at least one subscriber network, that prior to the specific time at which the plurality of subscribers of the at least one subscriber network is expected to subscribe to the different set of the plurality of television channels, subscribes to the different set of television channels in accordance with the anticipated working set such that media content associated with the different set of the plurality of television channels of the anticipated working set is available for delivery to the at least one subscriber network at the specific time during which the access node expects the plurality of subscribers of the at least one subscriber network to subscribe to the different set of the plurality of television channels, wherein to subscribe to the different set of television channels:

if a number of the plurality of television channels included in the anticipated working set exceeds the maximum anticipated channel count, the at least one interface requests those channels of the anticipated working set that have been requested by multiple subscribers of the plurality of subscribers of the at least one subscriber network before requesting those channels of the anticipated working set that have been requested only by a single subscriber of the plurality of subscribers of the at least one subscriber network.

12. The access node of claim 11, wherein the control unit:
determines a received working set of the plurality of television channels for the plurality of subscribers of the at least one subscriber network for which the access node is currently retrieving media data at a first time; and
determines the anticipated working set of the plurality of television channels for the plurality of subscribers of the at least one subscriber network as a difference between the received working set of the plurality of television channels and the historically delivered working set of the plurality of television channels at the specific time.

13. The access node of claim 12, wherein responsive to subscribing to the different set of the plurality of television channels of the anticipated working set, the at least one interface updates the plurality of television channels of the received working set to include the plurality of television channels of the anticipated working set.

14. The access node of claim 12, wherein the specific time comprises one of 15 minutes, 30 minutes and 60 minutes or a multiple thereof.

15. The access node of claim 11,
wherein the plurality of subscribers of the at least one subscriber network has previously subscribed to the historically delivered working set of television channels at the same time of a same day one or more weeks prior to the specific time of the same day.

16. The access node of claim 11, wherein the control unit further determines a pre-request time interval indicting how many units of time before the specific time at which the plurality of subscribers of the at least one subscriber network is expected to subscribe to the different set of the plurality of television channels that the access node is to subscribe to the different set of the plurality of television channels defined by the anticipated working set of the plurality of television channels, and wherein at units of time indicated by a pre-request time interval before the specific time at which the plurality of subscribers of the at least one subscriber network is expected to subscribe to the different set of the plurality of television channels specified by the anticipated working set, the at least one interface subscribes to the different set of the plurality of television channels in accordance with the anticipated working set of the plurality of television channels such that the media content associated with the different set of the plurality of television channels defined by the anticipated working set of the plurality of television channels is available for delivery to the plurality of subscribers of the at least one subscriber network at the specific time during which the access node expects the plurality of subscribers of the at least one subscriber network the at least one subscriber network to subscribe to the different set of the plurality of television channels defined by the anticipated working set to subscribe to the different set of the plurality of television channels.

17. The access node of claim 11, wherein the control unit further determines a hold time interval that indicates how many units of time after the specific time at which the different set of the plurality of television channels are expected to be requested that the access node is to wait before unsubscribing from those television channels of the different set of the plurality of television channels defined by the anticipated working set of the plurality of television channels that have not been requested by the at least one subscriber network.

18. The access node of claim 17, wherein the control unit further determines one or more of the plurality of television channels identified by the anticipated working set of the plurality of television channels that has not been requested by the at least one subscriber network, and wherein the at least one interface further unsubscribes from the determined one or more of the plurality of television channels that has not been requested.

19. The access node of claim 18, wherein the control unit is further configured to send at least one of an IGMP report message request and an IGMP general query message to the at least one subscriber network to determine the one or more channels that have not been requested by the at least one subscriber network.

20. The access node of claim 11,
wherein the at least one interface transmits at least one of an Internet Group Management Protocol (IGMP) message and a Protocol Independent Multicast (PIM) message to subscribe to the different set of the plurality of television channels,
wherein the access node comprises one of a Digital Subscriber Line Access Multiplexer (DSLAM), a Cable Modem Termination System (CMTS), or an Optical Line Terminal (OLT), and
wherein each of the plurality of television channels comprise different channels of an Internet Protocol Television (IPTV) service.

21. A system comprising:
at least one subscriber network that includes a subscriber device;
a network device;
an access node intermediately positioned between the at least one subscriber network and the network device, wherein the access node includes:
a control unit that adaptively determines an anticipated working set of a plurality of television channels for a plurality of subscribers of the at least one subscriber network based on a historically delivered working set of television channels comprising those of the plurality of television channels to which the plurality of subscribers of the at least one subscriber network has previously subscribed, wherein the anticipated working set:
    specifies a different set of the plurality of television channels to which the plurality of subscribers of the at least one subscriber network is expected to subscribe at a specific time, and
    includes one or more of the plurality of television channels such that a number of the one or more of the plurality of television channels included within the anticipated working set does not exceed a maximum anticipated channel count that identifies a maximum number of the plurality of television channels included within the anticipated working set of the plurality of television channels; and
at least one interface that couples the access node to the at least one subscriber network, that prior to the specific time at which the plurality of subscribers of the at least one subscriber network is expected to subscribe to the different set of the plurality of television channels, subscribes to the different set of the plurality of television channels in accordance with the anticipated working set such that media content associated with the different set of the plurality of the plurality of television channels of the anticipated working set is available for delivery to the at least one subscriber network at the specific time during which the access node expects the plurality of subscribers of the at least one subscriber network to subscribe to the different set of the plurality of television channels, wherein to subscribe to the different set of television channels:
    if a number of the plurality of television channels included in the anticipated working set exceeds the maximum anticipated channel count, the at least one interface requests those channels of the anticipated working set that have been requested by multiple subscribers of the plurality of subscribers of the at least one subscriber network before requesting those channels of the anticipated working set that have been requested only by a single subscriber of the plurality of subscribers of the at least one subscriber network.

22. A non-transitory computer-readable medium comprising instructions encoded on the computer-readable medium that, upon execution, cause a processor within a network device to:
adaptively determine an anticipated working set of a plurality of television channels for a plurality of subscribers of the at least one subscriber network based on a historically delivered working set of television channels comprising those of the plurality of television channels to which the plurality of subscribers of the at least one subscriber network has previously subscribed, wherein the anticipated working set:
    specifies a different set of the plurality of television channels to which the plurality of subscribers of the at least one subscriber network is expected to subscribe at a specific time, and
    includes one or more of the plurality of television channels such that a number of the one or more of the plurality of television channels included within the anticipated working set does not exceed a maximum anticipated channel count that identifies a maximum number of the plurality of television channels included within the anticipated working set of the plurality of television channels; and
prior to the specific time at which the plurality of subscribers of the at least one subscriber network is expected to subscribe to the different set of the plurality of television channels, subscribe to the different set of the plurality of television channels in accordance with the anticipated working set such that media content associated with the different set of the plurality of television channels of the anticipated working set is available for delivery to the at least one subscriber network at the specific time during which the access node expects the plurality of subscribers of the at least one subscriber network to subscribe to the different set of the plurality of television channels, wherein the instructions that cause the processor to subscribe to the different set of television channels comprise instructions that cause the processor to:
    if a number of the plurality of television channels included in the anticipated working set exceeds the maximum anticipated channel count, request those channels of the anticipated working set that have been requested by multiple subscribers of the plurality of subscribers of the at least one subscriber network before requesting those channels of the anticipated working set that have been requested only by a single subscriber of the plurality of subscribers of the at least one subscriber network.

* * * * *